(12) United States Patent
Strnad et al.

(10) Patent No.: US 8,035,369 B2
(45) Date of Patent: Oct. 11, 2011

(54) METHOD FOR DETECTING AN ISOLATED NETWORK

(75) Inventors: Michael Strnad, Kassel (DE);
Neidhardt Bechtel, Kassel (DE);
Christian Hardt, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 485 days.

(21) Appl. No.: 12/157,281

(22) Filed: Jun. 9, 2008

(65) Prior Publication Data

US 2009/0027037 A1 Jan. 29, 2009

(30) Foreign Application Priority Data

Jun. 14, 2007 (EP) .................................... 07011655
Jul. 7, 2007 (EP) .................................... 07013347

(51) Int. Cl.
*G01R 23/16* (2006.01)
*H02J 3/00* (2006.01)
(52) U.S. Cl. ..................... 324/76.21; 307/16; 700/286
(58) Field of Classification Search ............... 324/76.21; 307/16
See application file for complete search history.

(56) References Cited

U.S. PATENT DOCUMENTS

| | | | |
|---|---|---|---|
| 5,587,662 A | 12/1996 | Kelley et al. | |
| 6,810,339 B2 * | 10/2004 | Wills | 702/65 |
| 6,850,074 B2 * | 2/2005 | Adams et al. | 324/527 |
| 6,933,714 B2 * | 8/2005 | Fasshauer et al. | 324/76.21 |
| 7,015,597 B2 * | 3/2006 | Colby et al. | 307/31 |
| 7,106,564 B2 * | 9/2006 | Deng et al. | 361/62 |
| 7,376,491 B2 * | 5/2008 | Walling et al. | 700/292 |
| 2003/0098671 A1 * | 5/2003 | Hochgraf | 322/36 |
| 2003/0165036 A1 | 9/2003 | Tuladhar | |
| 2008/0204044 A1 | 8/2008 | Ponnaluri et al. | |

FOREIGN PATENT DOCUMENTS

| | | |
|---|---|---|
| DE | 19949997 A1 | 6/2001 |
| EP | 1340988 A2 | 2/2003 |
| EP | 1764894 A1 | 3/2007 |

OTHER PUBLICATIONS

Search Report for Application No. EP 07013347 Dated Oct. 17, 2008. 1 page.
Jeraputra C., et al. "Development of a Robust Anti-Islanding Algorithm for Utility Interconnection of Distributed Fuel Cell Powered Generation." IEEE Transactions on Power Electronics, vol. 19, No. 5, Sep. 2004. 8 Pages.

* cited by examiner

*Primary Examiner* — Timothy J Dole
(74) *Attorney, Agent, or Firm* — Eschweiler & Associates, LLC

(57) ABSTRACT

The subject matter of the invention is a method for detecting an isolated network for an inverter (2) carrying a converter voltage that is adapted for connection in parallel with a grid (5) having a mains frequency and electric loads and that is decoupled from the grid (5) by a choke (3), a test signal being superimposed upon the converter voltage at a test frequency the frequency of which is smaller than the mains frequency, the amplitude of the test signal being much smaller than the nominal voltage amplitude of the mains voltage on the one side but still just large enough on the other side for changes in reactive power to be detectable as a result of the test signal, a reactive power share being determined, which oscillates with the test frequency, this share not being allowed to fall below an imposed minimum for an isolated operation to be reliably excluded.

15 Claims, 4 Drawing Sheets

METHOD FOR DETECTING AN ISOLATED NETWORK

FIELD OF THE INVENTION

The invention relates to a method for detecting an isolated network for an inverter carrying a converter voltage that is adapted for connection in parallel with a grid having a mains frequency and electric loads and that is decoupled from the grid by a choke.

Special rates are often offered for such type customer generation systems so that it is of interest for the operator of such plants to feed the generated current into the utility grid. For operation in parallel with the utility grid, particular safety and connection conditions must be taken into consideration.

Of particular interest is the existing grid monitoring. A consumer generation system must detect a failure of the utility grid and then suspend operation. It is not allowed to continue feeding the grid since a person performing maintenance works at the utility grid may get injured if a grid portion has been disconnected but the consumer generation system is still working in this portion.

DESCRIPTION OF THE PRIOR ART

Known grid monitoring methods are divided into passive and active methods. Passive methods only evaluate the measured values of the (one or three phase) mains voltage and of the mains frequency. Active methods influence the grid through current or voltage distortions in such a manner that the mains parameters or the mains impedance may be inferred from the response. A current distortion yields a voltage response, a voltage distortion, a current response.

Methods for detecting isolated networks are known that rely on a periodical frequency change of the converter voltage. The converter frequency is thereby slightly changed for part of a period, for a period or for a plurality of periods. This results in a phase difference between the converter voltage and the mains voltage for a corresponding transient current to flow. If the grid fails, the isolated network follows the frequency change. Through positive feedback the frequency drift may be accelerated and switch-off may be achieved by trespassing the frequency limit value.

In connection with voltage controlled inverters, a varying phase difference results in undesired active power flows.

In the document EP 1340988 A2 a method is presented which is based on impressing a test current upon the mains. This test current hereby has at least two frequencies different from the mains frequency. By measuring the current and the voltage at these test frequencies one obtains the mains impedance at these test frequencies. In turn, the impedance at mains frequency is inferred therefrom. If the impedance changes are big, it is assumed that an isolated network has formed.

The method however needs a lot of computing time since the impedances are calculated by means of complex algorithms (e.g., FFT).

Methods for detecting isolated networks are further known which rely on impressing a pulse-shaped test current. At certain time intervals, a pulse-shaped test current is impressed in proximity to the zero crossing of the mains voltage. If the zero crossing of the mains voltage of this test current is displaced beyond an adjustable limit, one assumes that the impedance has changed and that an isolated network has formed.

Impressing a periodical, pulse-shaped current makes however an unpleasant noise similar to the ticking of an alarm clock. Moreover, in order to allow detecting properly the formation of an isolated network, high pulse currents are needed, which result in additional component load in the converter. Additionally, the method is very sensitive if displacements of the zero crossing on the mains voltage are detected through centralized ripple control signals. Insofar, the formation of an isolated network could be detected here although there is none.

BRIEF SUMMARY OF THE DESCRIPTION

It is the object of the invention to indicate a method that reliably allows for detecting an isolated network, additional energy consumption for providing interruption-free current supply being intended to be as low as possible and unpleasant side effects such as component load or noise being avoided.

In accordance with the invention, this object is achieved in that a test signal is superimposed upon the converter voltage at a test frequency the frequency of which is smaller than the mains frequency, the amplitude of the test signal being much smaller than the nominal voltage amplitude of the mains voltage on the one side but still just large enough on the other side for changes in reactive power to be detectable as a result of the test signal, a reactive power share being determined, which oscillates with the test frequency, this share not being allowed to fall below an imposed minimum for an isolated operation to be reliably excluded.

The invention relies on the observation that, in operation, the reactive power flow changes with the test frequency if the utility grid is stable. If the utility grid fails, the reactive power flow hardly changes by virtue of the test signal.

In accordance with the invention, a test signal is superimposed on the converter voltage at a frequency (test frequency) that is smaller than the mains frequency, its amplitude being small as compared to the mains voltage, the mains-side reactive power share oscillating together with the test frequency but still being detectable. This share is not allowed to fall below an imposed minimum for reliably excluding isolated operation.

The method of the invention offers the advantage that the additional energy expense is at its lowest. There is no or only a low additional component load. Also, the method does not make any noise; existing algorithms for calculating the reactive power may be used; additional energy consumption for providing an interruption-free current supply is minimal; displacements of the zero crossing, which are e.g., caused by centralized ripple control signals do not lead to unintended isolated network detections. Also, it is not necessary to analyze several frequencies in terms of computation. As a result, the computing expense is minimal.

In an advantageous further development of the method of the invention, there is provided that the voltage amplitude of the test signal is smaller than 2% of the nominal voltage amplitude of the mains voltage. As a result, the additional energy need is minimized, with detection of an isolated network still being reliably performed.

It has been found out that it is very advantageous if the frequency of the test frequency is considerably smaller than the mains frequency, in particular if the frequency of the test signal amounts to 0.5 to 5 Hz. This frequency may be well filtered out because it is far from the mains frequency.

Another advantageous developed implementation of the invention is characterized by the fact that the share of the mains reactive power oscillating with the test frequency is filtered out with the help of at least one so-called generalized integrator. Such type integrators operate reliably and are known for example from DE 199 49 997 A1.

Ideally, two integrators are provided, an output signal of a first integrator being supplied to a second integrator, with the outputs of the second integrator being supplied to square members and the outputs of the square members being then added in an adder, the output variable being square-rooted in a square-root extractor and then evaluated in an evaluation unit. A very good filter result is obtained as a result thereof. Practically, an aperiodic quantity of the square-root extractor is compared with a threshold value in the evaluation unit and monitored to see whether the value for the aperiodic quantity falls below the threshold value, this lower value being indicative of isolated network formation so that the inverter is disconnected from the mains. Accordingly, the evaluation unit monitors whether the aperiodic quantity falls below a minimum threshold, this being indicative of isolated network formation.

Alternatively, the reactive power may be filtered using a Görtzel algorithm or by means of a Fourier transformation. A suited FFT or a normal Fourier transformation may be utilized. In principle, other suited methods for calculating a characteristic variable from a periodic signal may also be utilized.

Another very important preferred provision includes that the method of the invention may be used on a three-phase system.

For safety reasons, it is important that, in the event of a grid failure, this grid is preferably isolated by means of a transfer contactor. Preferably, the inverter is configured to be a battery inverter, the battery serving as an electric energy accumulator in the event of a power failure or to store excess energy of a photovoltaic generator.

The inverter may however also be configured to be a speed variable internal combustion engine, e.g., for a wind generator, a water power plant or a photovoltaic plant. Here also, it is important to disconnect these generators from the grid if this grid fails.

A good concept is to connect at least one second inverter connected to a generator, in particular to a photovoltaic generator, in parallel with the inverter. Thus, electric loads may be fed either from the utility grid, from the photovoltaic generator and/or from the battery.

Further advantageous implementations of the invention will become apparent from the dependent claims.

The invention will be explained in closer detail herein after with reference to the drawings.

DETAILED DESCRIPTION OF THE INVENTION

Figure 1:
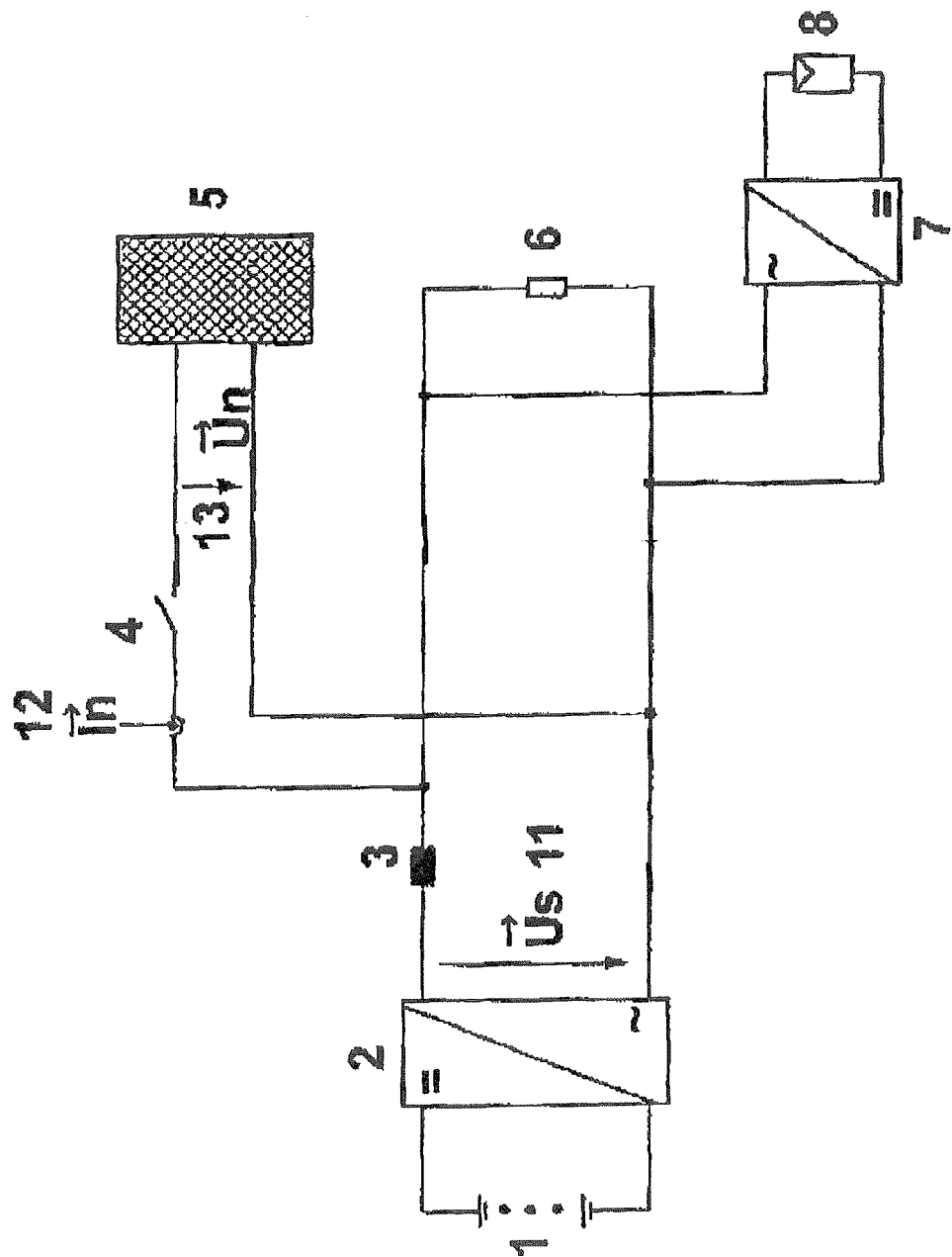
FIG. 1 shows an illustration of a circuit array with a battery inverter.

FIG. 1 shows an illustration of a circuit array with a battery inverter 2.

The circuit array constitutes a consumer generating system for electric energy. It not only includes the battery inverter 2, to which there is connected a rechargeable battery 1, but also a solar generator or a photovoltaic generator 8 with a second inverter 7 that is connected in parallel with the battery inverter. The battery inverter 2 has a choke 3 by which it is connected in parallel with a grid 5, a transfer contactor 4 being interposed therein between.

Instead of or in addition to the photovoltaic generator 8 and/or the battery, a wind power plant with PM generator, a speed variable internal combustion engine, a fuel cell or the like may be utilized. These are increasingly used for generating energy.

Special rates are often offered for such type consumer generation systems so that it is interesting for the operator of such plants to feed the generated current into the utility grid. If operated in parallel with the utility grid, particular safety and connection conditions must be taken into consideration.

Particular emphasis is placed on an existing grid monitoring. A consumer generation system must detect a failure of the utility grid and then stop operating. It is not allowed to continue feeding the grid as this might endanger a person performing maintenance work on the utility grid if a grid portion is disconnected whilst the consumer generation system continues operating in this portion.

If there is a consumer generation system according to FIG. 1, the operator would like to continue supplying a load 6 upon failure of the utility grid. For this purpose, the consumer generation system must be complemented with the battery-assisted additional inverter 2 or battery inverter 2.

Accordingly, a method for isolated network detection is utilized for the inverter 2 carrying a converter voltage that operates in parallel with the grid 5 at a mains frequency of 50 or 60 Hz and is connectable to the electric loads 6. The inverter 2 is decoupled from the grid 5 through the choke 3.

In accordance with the invention, a test signal having a test frequency that is smaller than the mains frequency is superimposed on the converter voltage, the amplitude of the test signal being much smaller than the nominal voltage amplitude of the mains voltage on the one side but still just large enough on the other side for changes in reactive power to be detectable as a result of the test signal. A reactive power share is thereby determined, and the inverter is disconnected from the mains if the value falls below a defined value. Through this disconnection from the mains, the loads 6 are no longer connected to the grid 5.

The battery inverter 2 ensures the load supply upon power failure of the grid 5 even if the consumer generation system is not capable of delivering energy for the moment because of cloudy weather with low sun irradiation. This battery inverter 2 is equipped with the transfer contactor by means of which the connection of the consumer generation system to the utility grid or to the grid 5 may be interrupted.

Accordingly, the consumer generation system consists of the solar inverter 7, the photovoltaic generator 8 and the battery inverter 2.

As can be seen from FIG. 1, the battery 1 is connected to the grid 5 via the battery inverter and the decoupling choke 3 as well as via the transfer contactor 4. The loads 6 are supplied from the grid 5 or from the battery inverter 2 if the transfer contactor 4 is open. Through the solar inverter 7, the solar generator 8 may contribute to supply the loads 6. If more solar energy is generated than needed by the load 6, the battery may be charged through the battery inverter 2 or energy may be fed into the grid 5. The inverter 2 is therefore preferably configured to be a bidirectional inverter.

If the grid 5 fails, this situation must be detected soon for the transfer contactor 4 to open immediately and for the loads 6 to be supplied without any interruption. For this purpose, the method of the invention is utilized.

The converter voltage 11, the mains current 12 and the mains voltage 13 are measured and supplied in digitized form to a suited digital computer (not shown), more specifically to a microprocessor.

A test voltage having a very small amplitude, in particular about 1% of the mains voltage or less and with a test frequency that is much smaller than the mains frequency of 50 Hz or 60 Hz, is now superimposed on the converter voltage 11. The reactive power, i.e., the mains frequency reactive power on the mains side, is preferably calculated also for other control functions. Accordingly, the reactive power is calculated at no additional expense. The share of reactive power oscillating with the test frequency is filtered out with the help of what is referred to as a generalized integrator. Such type generalized integrators are discussed in closer detail in the document DE 199 49 997 A1.

Figure 2:
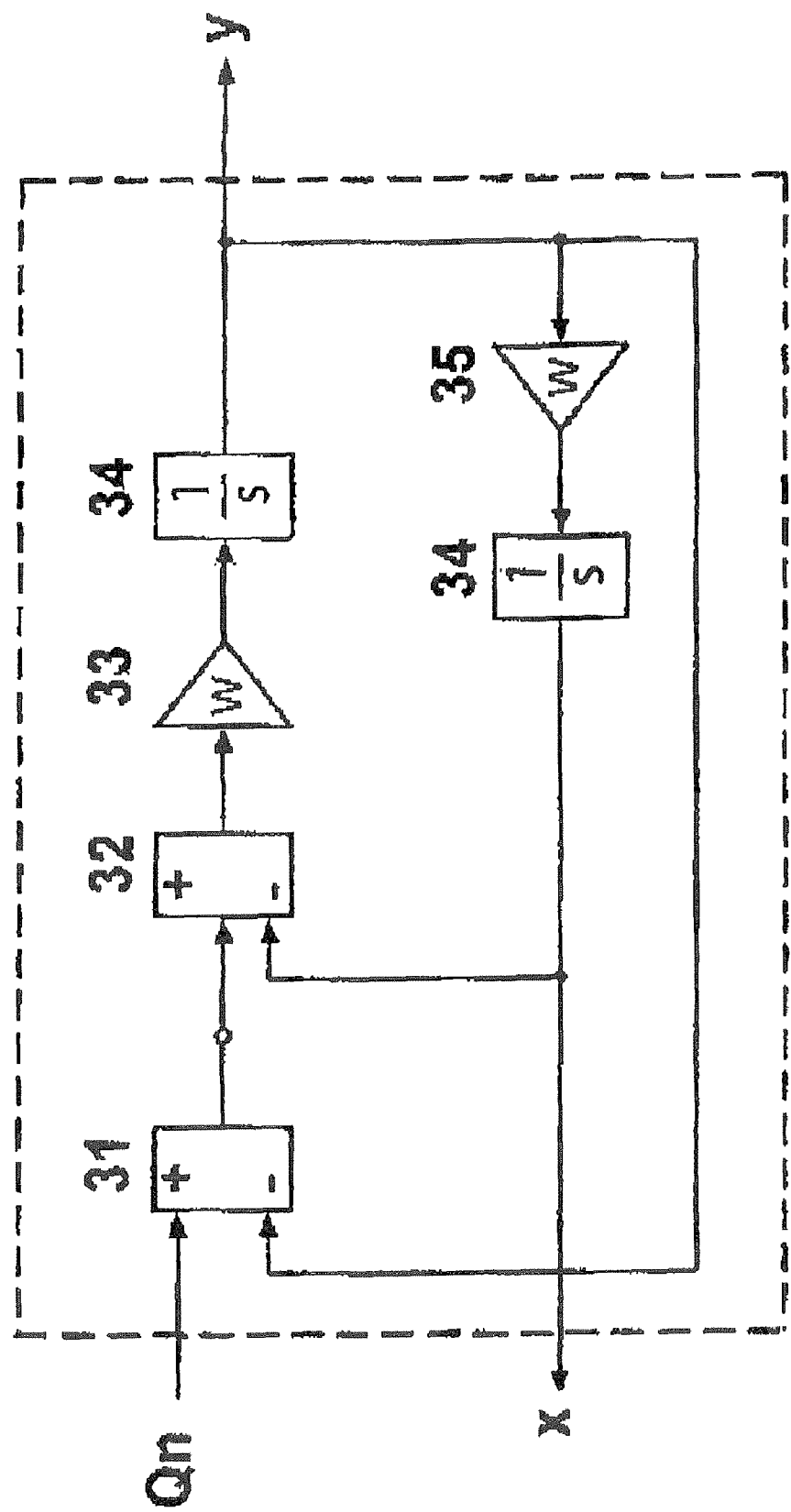
FIG. 2 shows an illustration of an integrator circuit.

FIG. 2 shows such a generalized integrator. The integrator includes two subtraction members 31 and 32, two amplifiers 33 and 35 and two integrators 34 and 36. The amplifiers 33, 35 multiply the respective input signal by a circuit frequency to which the generalized integrator is tuned. In this example, the circuit frequency is obtained from the test frequency multiplied by 2×Pi (Hz). The mains-side mains frequency reactive power serves as the input variable of the circuit shown. At the output y, one obtains the reactive power share that oscillates with the test frequency. The output x is the reactive power share displaced by 90° with respect to the output y that oscillates with the test frequency.

Figure 3:
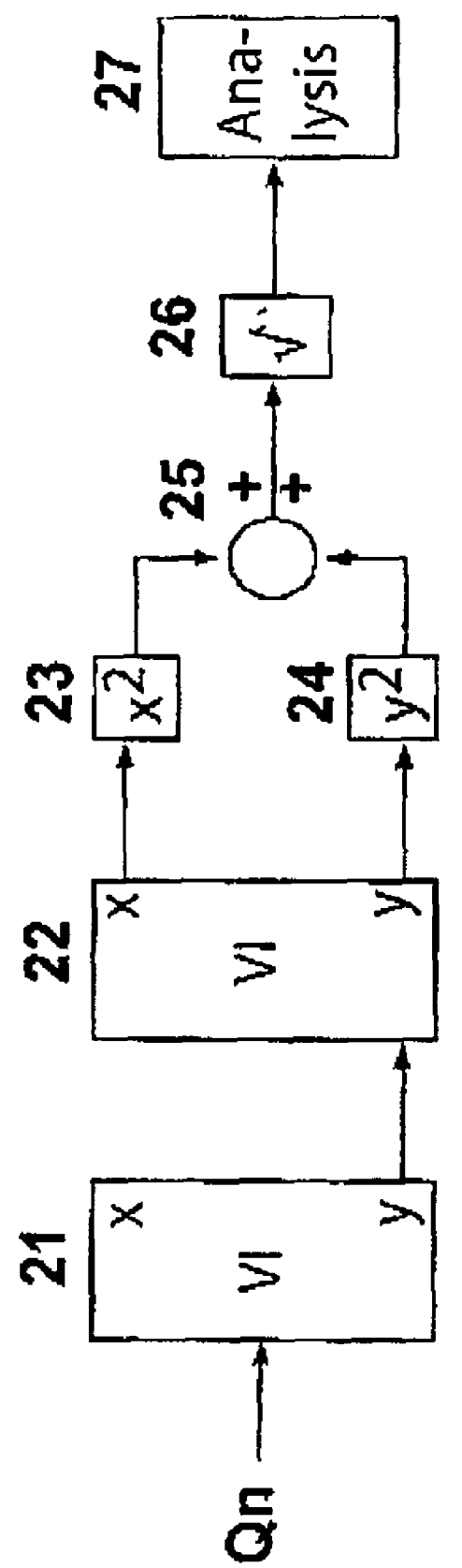
FIG. 3 shows an illustration of a circuit array for isolated network detection.

FIG. 3 shows a block diagram for detecting the formation of an isolated network. An isolated network may be detected by an analogous circuit or through a microprocessor program. Therefore, FIG. 3 represents the complete algorithm needed to detect the formation of an isolated network.

The grid-side, mains-frequency reactive power serves as the input variable for the generalized integrator 21. Its output variable y serves as the input variable for the generalized integrator 22, which generates the output signals x and y that are displaced 90° relative to each other. These output signals are then squared in square members 23 and 24 and the outputs of the square members are added in an adder 25 the output variable of which is square rooted in a square-root extractor 26 and finally supplied to an evaluation unit 27. The evaluation unit 27 as well as the other members may be realized by a program of the microprocessor, meaning by software only.

The output of the square-root extractor 26 is an aperiodic quantity. The evaluation 27 monitors this aperiodic quantity. If the aperiodic quantity falls below an imposed threshold, this means that an isolated network has formed because the grid-side reactive power oscillates very little or not at all with the test frequency.

Figure 4:
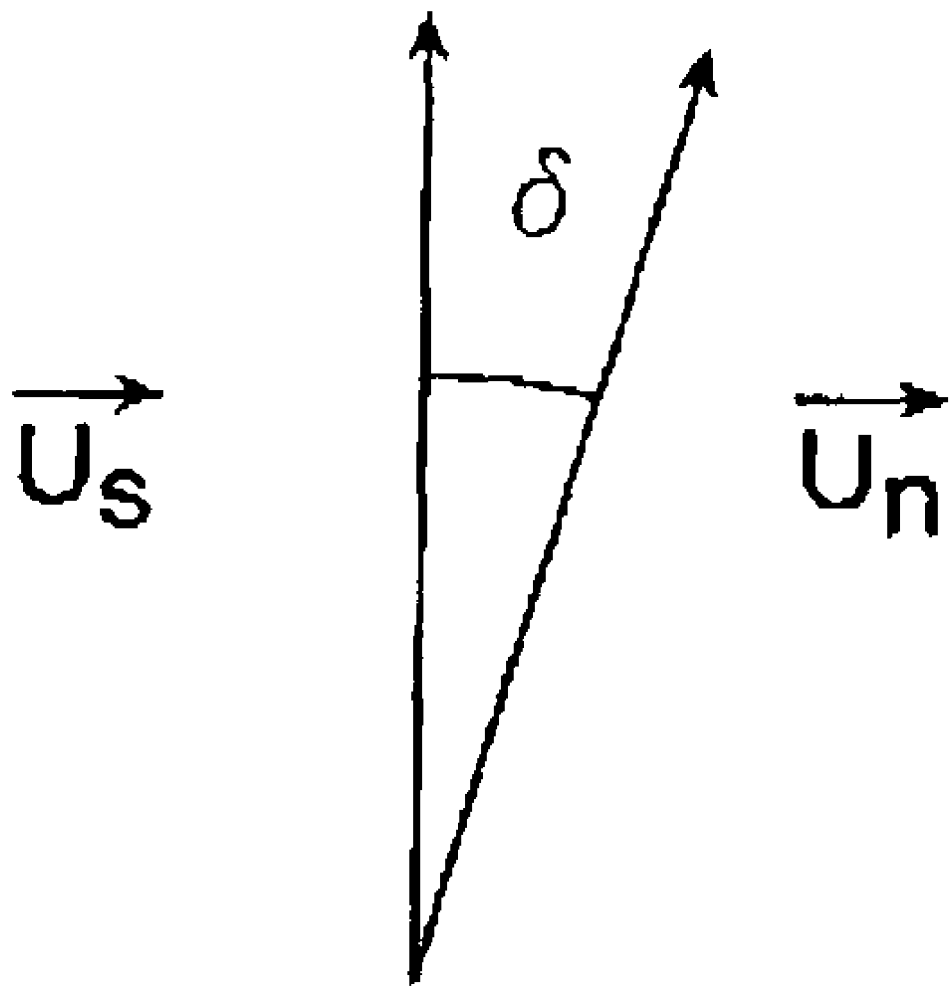
FIG. 4 shows a vector diagram with a converter voltage $U_s$ and a mains voltage $U_n$.

FIG. 4 shows a voltage diagram. It serves to illustrate the following mathematical context.

The power P is calculated from $$P=((U_s \times U_n)/(\omega \times 2L)) \times \sin\delta \approx ((U_s \times U_n)/(\omega \times 2L)) \times \delta \text{ (for small angles } \delta)$$

The reactive power Q amounts to $$Q=(U_s^2-U_s \times U_n)/(\omega \times 2L)$$

$$Q=Q_n[i_n, u_n]$$

$U_s$ is thereby a converter voltage and $U_n$ a mains voltage. For small voltage differences between $U_s$ and $U_n$, the above relation applies and it may be readily seen therefrom that the reactive power flow exceeds significantly the active power flow when the differences are small.

In order to increase the power, it is advantageous if several battery inverters 2 may be connected in parallel. Another advantage is obtained if the inverter is voltage-controlled, each inverter 2 comprising a decoupling choke 3. The mains voltage, the mains frequency, the inverter's active power and the inverter's reactive power are measured thereby. The momentary mains voltage thereby serves as a base for computing the needed target value for the reactive power. The reactive power is then set by a controller of the battery inverter according to this target value. If the voltage drops, the reactive power increases. The momentary mains frequency thereby serves as a basis for computing the needed active power target value. The active power is then set by the controller of the battery inverter 2 according to this target value. If the frequency drops, the active power increases.

A reactive power measurement already existing in this constellation in the inverter 2 is preferably utilized in the method of the invention to detect an isolated network.

In the example shown, the amplitude of the converter voltage is superimposed on the converter voltage with a sinusoid, the frequency of the superimposed voltage (test frequency) being much smaller than the mains frequency (about 1 to 2 Hz) and the voltage amplitude of the superimposed voltage being just high enough for the reaction to this change in voltage to be detected with sufficient accuracy (about 1% of the nominal voltage amplitude or less). The reactive power flow is measured on the grid side. If the utility grid is stable, this reactive power flow changes with the test frequency. If the utility grid fails, the reactive power flow no longer varies or varies significantly less with the test frequency. This change is recorded as well as, by virtue of the change in the reactive power flow, the fact that the utility grid no longer operates. Then, the transfer contactor 4 must be opened.

The invention is not limited to this example; the reactive power with regards to the share that oscillates with the test frequency may also be filtered with other algorithms.

The method may also be used in three-phase systems. Each phase may be considered irrespective of the other phases. The test signals need not be synchronized.

In three phase systems, which have three phases, a voltage may be modulated such that the voltage signal is displaced 120° relative to the mains frequency in all the three phases. A space vector signal of this three-phase system is thus obtained upon which a voltage having the test frequency is impressed. The reactive power oscillating with the test frequency may then be calculated from the mains current converted into said space vector model and from the mains voltage converted into said space vector model.

Several parallel converters may be operated on the mains. The test signals of the various converters are then synchronized via a suited data connection.

Several parallel converters may also be operated on the mains if the test signals of the various converters connected in parallel on the mains vary slightly in their frequency and may be considered independently as a result thereof.

The reactive power that oscillates with the test frequency may be filtered using the Görtzel algorithm or a suited FFT or a normal Fourier transformation if a generalized integrator is not to be used.

LIST OF NUMERALS

1 Battery
2 battery inverter
3 decoupling choke
4 transfer contactor
5 grid 6 load
7 second inverter
8 photovoltaic generator
11 converter voltage
12 mains current
13 mains voltage
21 first integrator
22 second integrator
23, 24 square members
25 adder
26 square root extractor
27 evaluation unit
31, 32 subtraction members
33 first amplifier
34 first integrator
35 second amplifier
36 second integrator

We claim:

1. A method for detecting an isolated network condition for an inverter carrying a converter voltage that is connected in parallel with a grid having a mains frequency, a mains voltage, and electric loads, and that is decoupled from the grid by a choke, comprising:
   superimposing a test signal upon the converter voltage at a test frequency, wherein the test frequency of the test signal is smaller than the mains frequency, and wherein an amplitude of the test signal is much smaller than a nominal voltage amplitude of the mains voltage, but still just large enough for changes in reactive power to be detectable as a result of the test signal,
   detecting a reactive power delivered by the inverter, which oscillates with the test frequency of the test signal, and detecting the isolated network condition if the detected reactive power falls below an imposed minimum level.

2. The method as set forth in claim 1, wherein an amplitude of the test signal is smaller than 2% of the nominal voltage amplitude of the mains voltage.

3. The method as set forth in claim 1, wherein the frequency of the test signal is between 0.5 Hz to 5 Hz.

4. The method as set forth in claim 1, further comprising filtering out the reactive power that oscillates with the test frequency using at least one integrator.

5. The method as set forth in claim 4, wherein the at least one integrator comprises two integrators, wherein an output signal of a first integrator is supplied to a second integrator, with outputs of said second integrator are supplied to square members and outputs of the square members are added together in an adder, wherein an output of the adder is square-rooted in a square-root extractor and evaluated in an evaluation unit.

6. The method as set forth in claim 5, further comprising comparing an aperiodic quantity output from the square-root extractor to a threshold value in the evaluation unit and monitoring the aperiodic quantity to see whether a value for the aperiodic quantity falls below the threshold value, wherein the aperiodic quantity falling below the threshold value is indicative of an isolated network condition, wherein the inverter is disconnected from the mains.

7. The method as set forth in claim 1, further comprising filtering the reactive power that oscillates with the test frequency using a Görtzel algorithm or by means of a Fourier transformation.

8. The method as set forth in claim 1, wherein the grid is a three phase grid.

9. The method as set forth in claim 8, wherein superimposing a test signal comprises superimposing a phase test signal upon each of the three phases.

10. The method as set forth in claim 9, wherein the phase test signals of the three phases are phase shifted by 120° relative to each other.

11. The method as set forth in claim 9, wherein detecting a reactive power comprises detecting a reactive phase power on each of the three phases.

12. The method as set forth in claim 11, wherein the reactive power is calculated from the reactive phase powers of the three phases.

13. The method as set forth in claim 1, wherein the inverter comprises a battery inverter configured to couple a battery to a load, wherein the battery operates as an electric energy accumulator.

14. The method as set forth in claim 1, wherein the inverter is configured to be coupled to a speed variable internal combustion engine, a wind generator, a water power plant, or a photovoltaic plant.

15. The method as set forth in claim 1, wherein the inverter is connected to the grid through a transfer contactor so that the inverter is configured to be selectively disconnected from the grid.

* * * * *